US 6,567,238 B1

(12) United States Patent
Renken et al.

(10) Patent No.: US 6,567,238 B1
(45) Date of Patent: May 20, 2003

(54) DISC CLAMP FOR A DISC DRIVE

(75) Inventors: Frederick Paul Renken, Boulder, CO (US); Frederick Mark Stefansky, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 51 days.

(21) Appl. No.: 09/689,561

(22) Filed: Oct. 12, 2000

Related U.S. Application Data
(60) Provisional application No. 60/158,846, filed on Oct. 12, 1999, and provisional application No. 60/158,844, filed on Oct. 12, 1999.

(51) Int. Cl.⁷ .............................................. G11B 17/022
(52) U.S. Cl. ................................................... 360/99.12
(58) Field of Search ............................. 360/98.08, 99.05, 360/99.08, 99.12; 369/264, 270, 271

(56) References Cited

U.S. PATENT DOCUMENTS

| 4,864,443 A |   | 9/1989  | Peterson ................. 360/99.12 |
|-------------|---|---------|-------------------------------------|
| 4,918,545 A | * | 4/1990  | Scheffel .................. 360/98.08 |
| 5,075,808 A |   | 12/1991 | Johnson .................. 360/98.08 |
| 5,101,306 A |   | 3/1992  | Johnson .................. 360/98.08 |
| 5,243,481 A |   | 9/1993  | Dunckley et al. ........ 360/99.08 |
| 5,296,981 A |   | 3/1994  | Ogawa .................... 360/99.08 |
| 5,452,157 A |   | 9/1995  | Chow et al. ............. 360/98.08 |
| 5,486,961 A |   | 1/1996  | Boutaghou et al. ...... 360/99.12 |
| 5,550,690 A |   | 8/1996  | Boutaghou et al. ...... 360/99.12 |
| 5,590,004 A |   | 12/1996 | Boutaghou ............... 360/99.12 |
| 5,790,345 A |   | 8/1998  | Alt ........................... 360/9.08 |
| 5,790,346 A | * | 8/1998  | Fletcher .................. 360/99.12 |
| 5,877,571 A |   | 3/1999  | Brooks .................... 360/99.12 |
| 5,880,905 A |   | 3/1999  | Kazmierczak et al. ... 360/98.08 |
| 5,917,677 A | * | 6/1999  | Moir et al. .............. 360/98.08 |
| 6,282,054 B1 | * | 8/2001 | Luo ......................... 360/98.08 |

* cited by examiner

*Primary Examiner*—David L Ometz
(74) *Attorney, Agent, or Firm*—Merchant & Gould P.C.

(57) ABSTRACT

An apparatus and method for uniformly centering and retaining an information storage disc on a spindle motor. A disc drive spindle motor assembly including a rotatable motor spindle having a top portion and a hub portion, and an annular disc mounted over the top portion and supported on the hub portion. The assembly further includes an annular disc clamp mounted over the top portion of the spindle, and having a centering portion and a peripheral clamping portion. A disc clamp retainer is fastened to the spindle applying a compressive force to the disc clamp to secure the disc against the hub portion. The centering portion of the disc clamp has a series of spaced centering tabs adapted to abut the spindle and symmetrically push against the annular disc when the compressive force is applied to the disc clamp.

23 Claims, 9 Drawing Sheets

DISC CLAMP FOR A DISC DRIVE

RELATED APPLICATIONS

This application claims the priority of U.S. Provisional Patent Application Serial No. 60/158,846 entitled "HARD DISC DRIVE (HDD) CLAMP AND RETAINER FOR CENTERING THE DISC DURING ASSEMBLY" filed Oct. 12, 1999, and U.S. Provisional Patent Application Serial No. 60/158,844 entitled "HARD DISC DRIVE (HDD) CLAMP WITH TABS FOR CENTERING THE DISC DURING ASSEMBLY" filed Oct. 12, 1999.

FIELD OF THE INVENTION

This application relates to magnetic disc drives and more particularly to an improved disc drive clamp and disc drive spindle motor apparatus for centering and mounting an information storage disc within the disc drive.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Spindle motor assemblies often utilize a rotating spindle hub journaled to a non-rotatable spindle shaft. A disc clamp is typically secured to the rotating spindle hub to exert a downward axial force on the mounted information storage discs and disc spacers in order to securely fasten the discs and spacer together on the hub. Typically, the disc clamp is basically an annular leaf spring that is sized such that its outer rim exerts the downward force through a series of equally spaced screws positioned around the central portion of the clamp and torqued through holes in a central portion of the clamp into the spindle hub. The spaced radial positioning of the screws is beneficial for exerting a distributed clamping force on the stacked discs on the spindle assembly because the force is exerted at the periphery of the clamp in closer proximity to the mounted information storage discs and disc spacers. However, the screw is a discrete source of the clamping force, thus the distribution of the downward force around the periphery of the clamp, against the adjacent disc is exerted in a non-uniform manner. Non-uniform clamping force can generally cause variations in the load force applied and, as a result, can cause the top mounted information storage disc to be physically distorted. Distortion of the top disc, even by as little as 100 micro inches, can lead to generation of unacceptable operational errors during recording and reproduction of data on the information storage disc.

In a second type of spindle motor assembly the spindle shaft and spindle hub portion both rotate about a bearing sleeve. Here, a single screw can be used to secure the disc clamp to the rotating spindle shaft because the shaft rotates with the screw (as opposed to the non-rotatable shaft where a plurality of screws must be positioned in the hub about the shaft). However, in order to develop a clamping force with a single screw similar to the force developed by the plurality of screws surrounding the non-rotatable shaft, it is necessary to apply a much higher torque to the single screw. This relatively high torque requirement can lead to a number of problems including over-stressing the spindle shaft bearing, stripping threads, and the generation of particles during the torquing process. These high-torque related problems can damage the bearing and lead to failure of the spindle motor.

Currently, there is a need in the relevant art to overcome the shortcomings of the traditional single screw disc drive spindle motor assembly, as well as the non-rotatable multiple screw spindle shaft spindle motor. Furthermore, most current designs do not use the disc clamp to center the disc during installation. The centering of the disc is critical to the accurate locating of the head over the center of the desired track. Most centering occurs through the use of additional structures and operations, which can be complex and costly. Therefore, there is also currently a need in the relevant art to overcome the shortcomings of the traditional centering structures and operations for centering a disc on a drive spindle motor assembly.

SUMMARY OF THE INVENTION

Against this backdrop the present invention has been developed. The present invention is an apparatus and method for uniformly centering and retaining an information storage disc on a spindle motor.

In accordance with one preferred embodiment, the invention can be implemented as a disc drive spindle motor assembly including a rotatable motor spindle having a top portion and a hub portion, and an annular disc mounted over the top portion and supported on the hub portion. The assembly further includes an annular disc clamp mounted over the top portion of the spindle, and having a centering portion and a peripheral clamping portion. A disc clamp retainer is fastened to the spindle applying a compressive force to the disc clamp to secure the disc against the hub portion. The centering portion of the disc clamp has a series of spaced centering tabs adapted to abut the spindle and symmetrically push against the annular disc when the compressive force is applied to the disc clamp.

The invention can be implemented in accordance with another preferred embodiment as a disc clamp for use in centering and attaching an information storage disc to a disc drive spindle motor assembly having a spindle. The disc clamp includes an annular disc shaped body having a centering portion around a central aperture and an annular peripheral clamping portion. The centering portion has a series of centering tabs extending inwardly toward the central aperture from the peripheral clamping portion. Each of the centering tabs have a middle portion, an inward surface for contacting the drive motor spindle, and an outwardly projecting tip surface for contacting the data storage disc. When the disc and the clamp are installed on the top portion of the spindle and a compressive force is applied to the middle portion of the clamp, the clamp acts to center the disc about the spindle, and clamp the disc to the hub portion of the spindle.

In some embodiments, a separate retainer member is used to maintain the clamp on the spindle. In some other embodiments the disc clamp includes a series of inwardly directed retainer tabs that engage the spindle to fasten the clamp about the spindle.

These and various other features as well as advantages which characterize the present invention will be apparent from a reading of the following detailed description and a review of the associated drawings.

DETAILED DESCRIPTION

Figure 1:
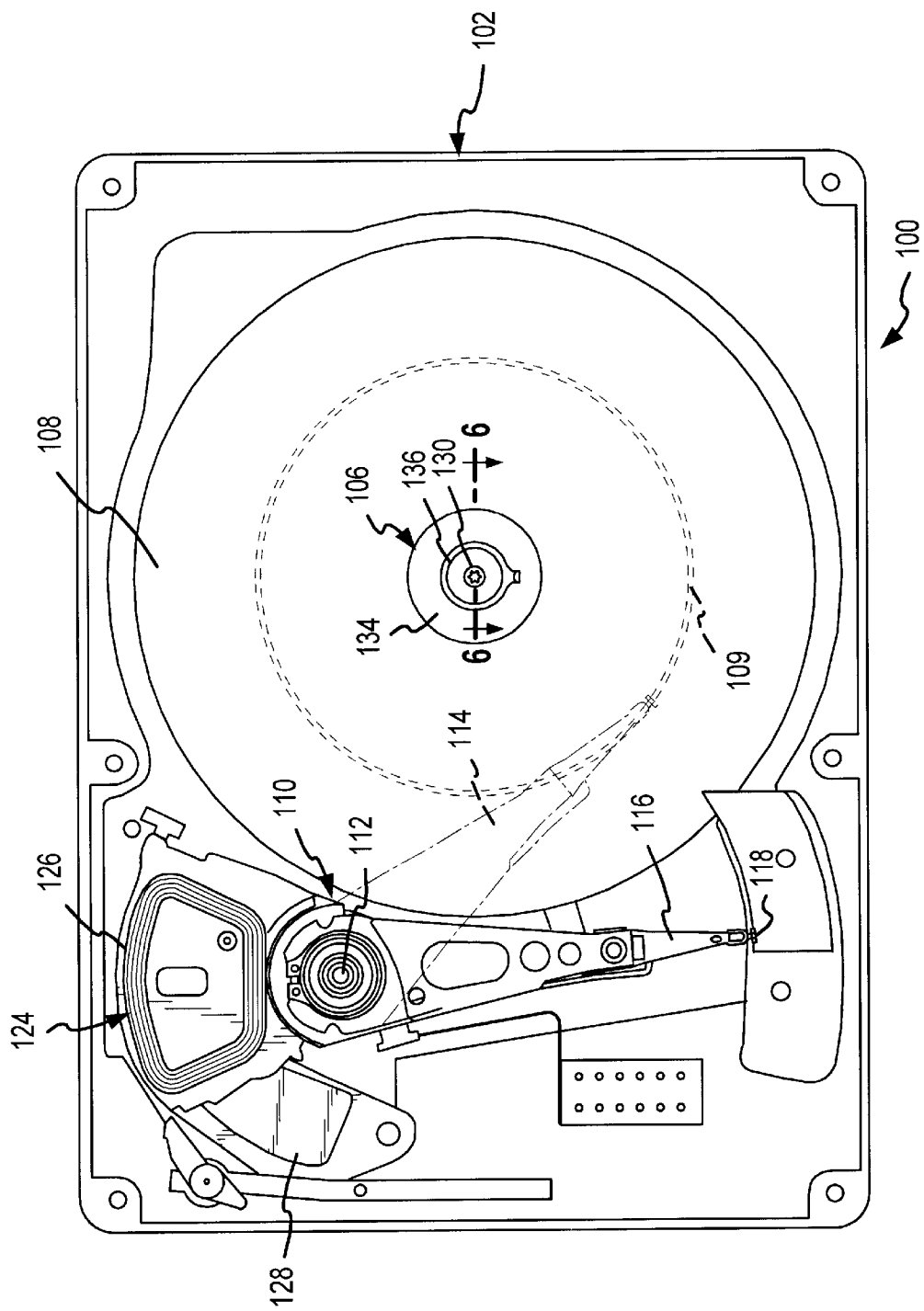
FIG. 1 is a top plan view of a disc drive, with its top cover removed, incorporating a disc clamping assembly in accordance with a preferred embodiment of the present invention.

A disc drive 100 constructed in accordance with a preferred embodiment of the present invention is shown in FIG. 1. The disc drive 100 includes a base plate 102 to which various components of the disc drive 100 are mounted. A top cover (not shown) cooperates with the base 102 to form an internal, sealed environment for the disc drive 100 in a conventional manner. The components include a disc drive motor 106 that rotates one or more information storage discs 108 at a constant high speed. The disc drive spindle motor 106, rotates a spindle 130 carrying one or more information storage discs 108, a disc clamp 134 and a disc clamp retainer 136. The spindle 130, and therefore the one or more information storage discs 108, are rotated about the spindle axis of rotation by the spindle motor 106, as is generally known in the art.

Information is written to and read from tracks 109 on the discs 108 through the use of an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider (not shown) enabling the head 118 to fly in close proximity above the corresponding surface of the associated information storage disc 108.

The radial position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

Figure 6:
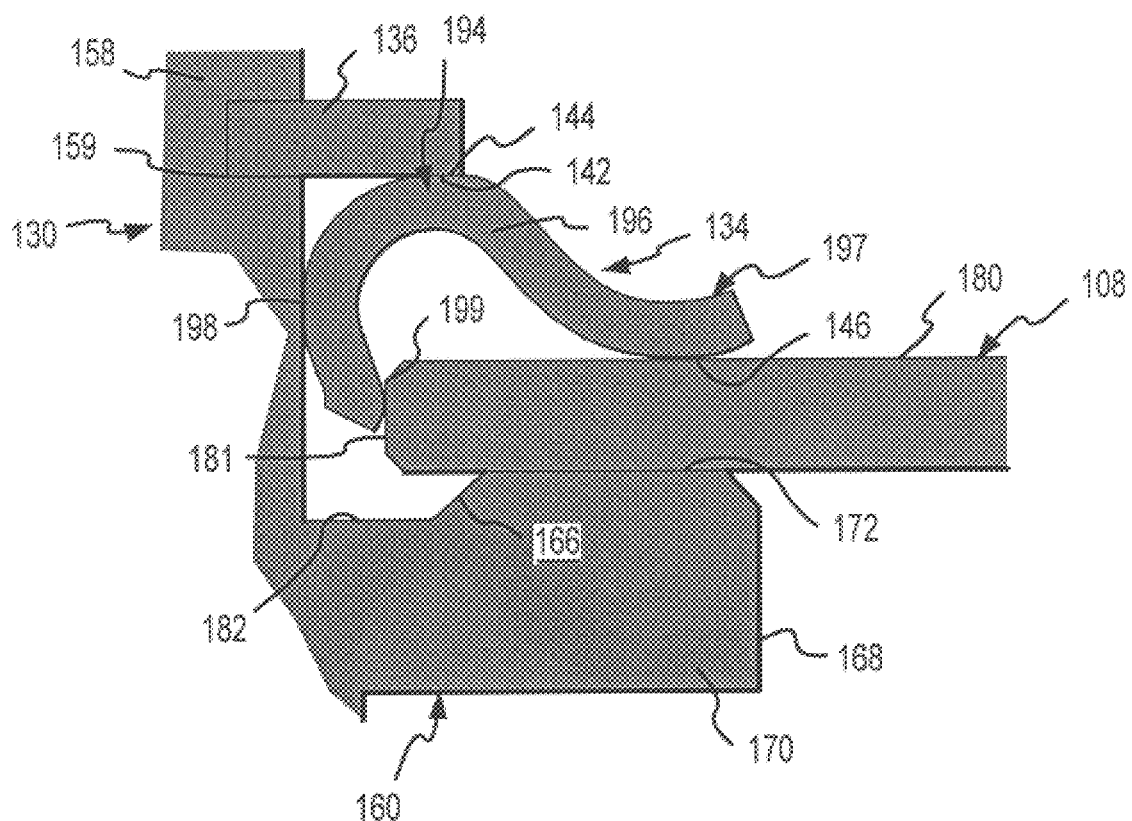
FIG. 6 is a sectional view through a portion of the disc clamping assembly in accordance with the preferred embodiment of the present invention shown in FIG. 1 along lines 6—6, through the disc clamp and disc clamp retainer positioned on the disc drive spindle hub.

FIG. 6 is a partial cross sectional view of the drive motor assembly in the disc drive 100 taken along lines 6—6 in FIG. 1. The spindle 130 is preferably a generally cylindrical body symmetrical about the spin axis. The spindle 130 has a cylindrical top portion 158 including an annular groove 159 therein. The groove 159 is generally perpendicular to the spindle axis of rotation. The top portion 158 of the spindle 130 need only be of such length and size to effectively form the groove 159 such that the groove can mate with a disc clamp retainer 136 as is described in greater detail below.

An annular hub portion 160 extends radially outward from the spindle 130 below the top portion 158. The hub portion 160 has an annular flange 170 having a top surface 172 which further has a slanted top interior annular shoulder 166 and a downwardly projecting peripheral shoulder 168. The top surface 172 is a disc loading surface for receiving and supporting an information storage disc 108, or in some embodiments, a disc stack made up of a number of alternating discs 108 and spacer rings (not shown). The storage disc has an upper surface 180 and an inner peripheral surface 181. Preferably, the loading surface 172 is a generally flat surface. An annular relief groove 182 is formed in the surface 172 adjacent to the top interior annular shoulder 166, surrounding the vertically extending portion of the spindle 130.

The information storage disc 108 is secured to the spindle 130 between the annular flange 170 and an annular disc clamp 134 that is mounted around the top portion 158 of the spindle 130. The disc clamp 134 is held in position by a disc clamp retainer 136 that engages the spindle 130, preferably by mating with the annular groove 159. In this embodiment, the disc clamp retainer 136 is a separate member that mates with the groove 159 and has an engagement surface 142, preferably flat for interacting with an upper contact surface 144 of the disc clamp 134. The engagement surface 142 extends around the clamp 134 generally parallel to the loading surface 172 of the annular flange 170. The disc clamp retainer 136 can be a generally "U" shaped clip as shown in FIG. 1 or any of a broad variety of structural configurations designed to engage the groove 159 and press against the engagement surface 142 of the clamp 134. A conventional snap ring may also be used. Additionally, in some other embodiments, as will be discussed in more detail below, the retainer can be a structure connected to, and preferably integral with, the disc clamp 134.

Figure 3:
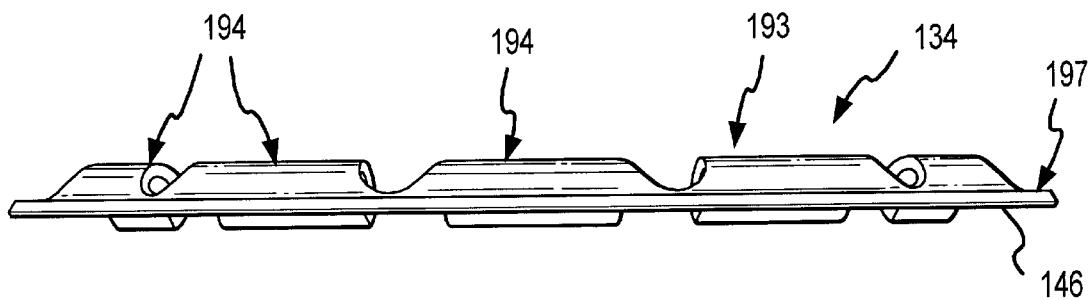
FIG. 3 is a side view of the disc clamp of FIG. 2.
Figure 4:
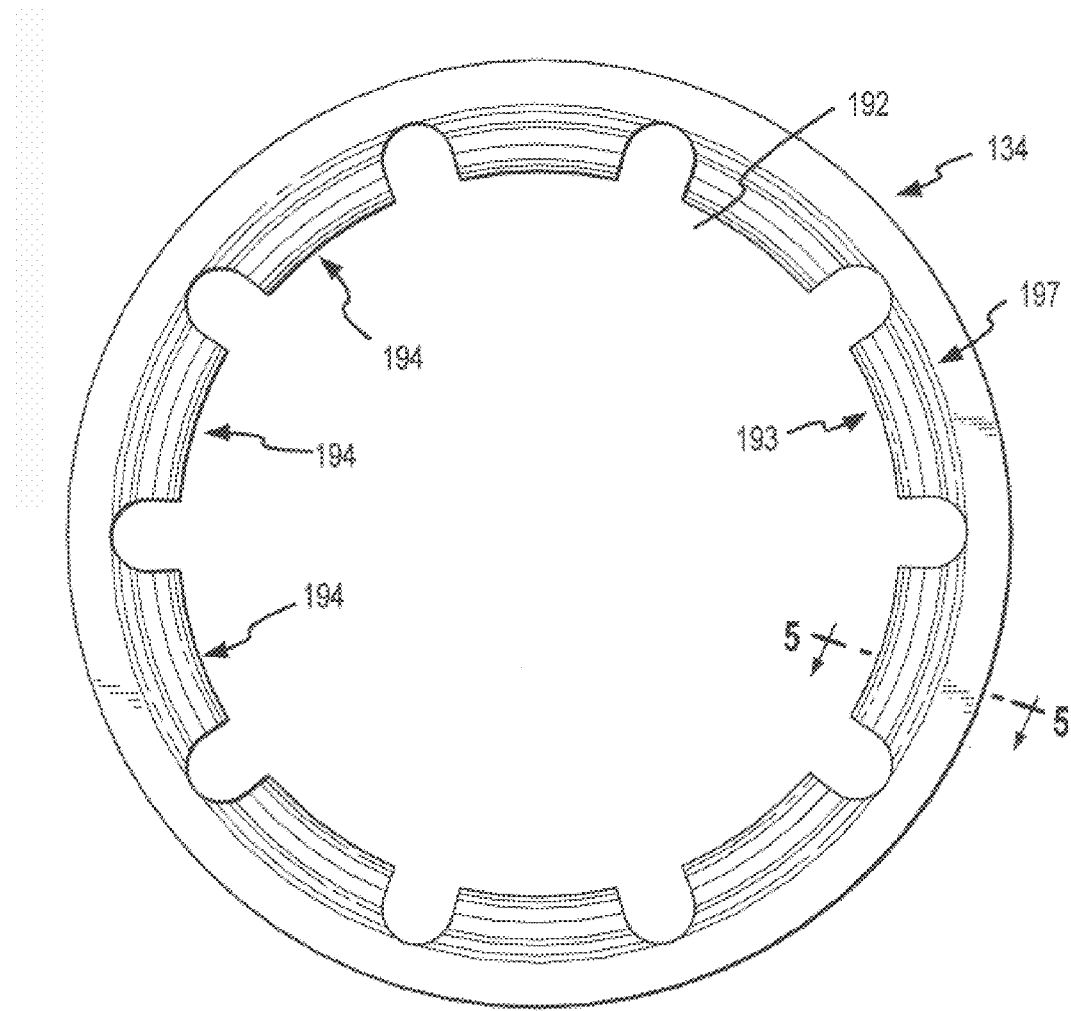
FIG. 4 is a top plan view of the disc clamp of FIG. 2.
Figure 5:
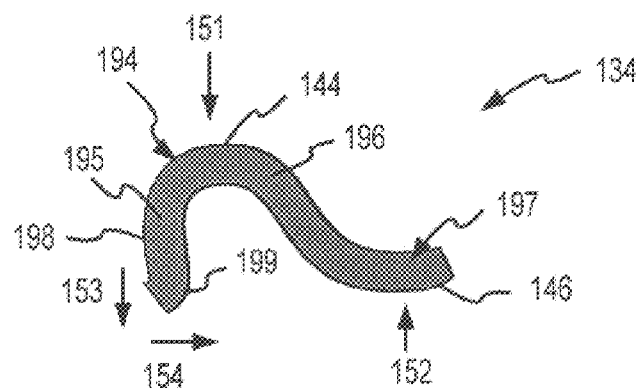
FIG. 5 is a sectional view of the disc clamp of FIG. 4 taken along lines 5—5 in FIG. 4.

The disc clamp 134, as shown in FIGS. 2–5, is a spring member having a generally annular shape. The disc clamp 134 defines a centrally located aperture 192, and has an outer peripheral portion 197 that has a lower contact surface 146. The disc clamp 134 further includes a centering portion 193 around the aperture 192 that has a plurality of centering tabs 194 that are connected to the outer peripheral portion 197, and first extend upwardly and inwardly and then downwardly and inwardly into the centrally located aperture 192. Referring to FIG. 5, the centering tabs 194 are each preferably generally hook shaped in cross section. Each tab 194 has a middle raised portion 196 having an upper contact surface 144, a downwardly projecting portion 195 including an inwardly facing spindle contact surface 198, and an outwardly projecting disc contact tip surface 199. The centering tabs 194 have multiple functions in that they work to transfer the vertical disc clamping force, and to center the disc clamp 134 about the spindle 130, as well as to center the disc 108 about the spindle 130 during disc installation, as will be discussed in more detail below.

Figure 2:
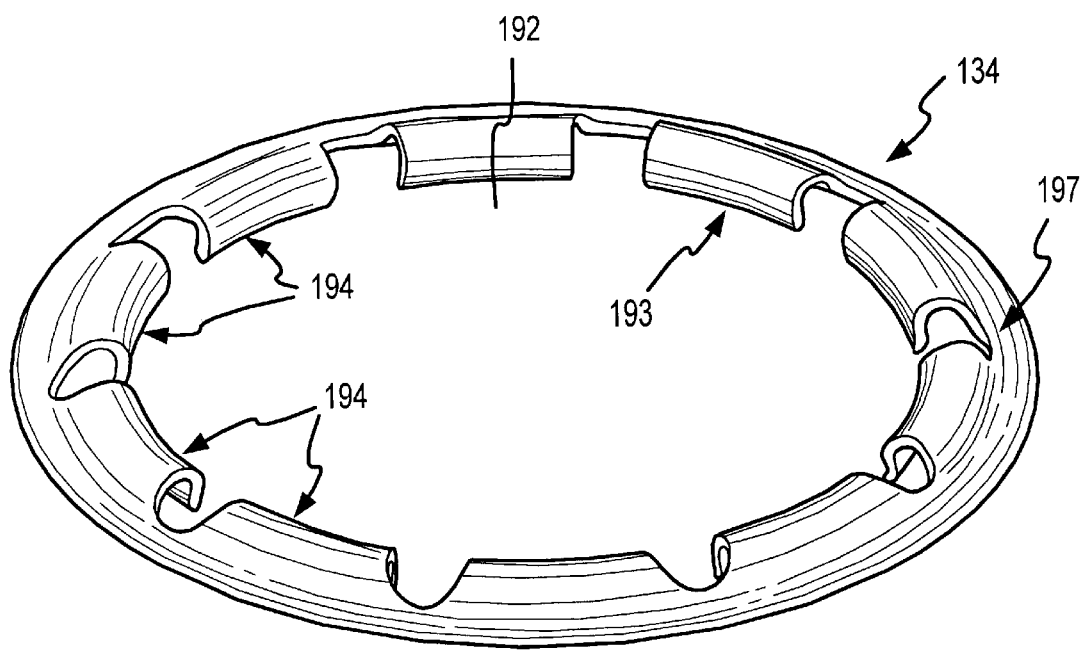
FIG. 2 is a separate perspective view of a disc clamp of the disc clamping assembly shown in FIG. 1.

Ten centering tabs 194 are shown in FIGS. 2–4. However, it should be understood that additional, or fewer centering tabs 194 can be used in other embodiments. Preferably, at least three centering tabs 194 are used. In addition, other tab widths than illustrated may be utilized.

Referring to the cross sectional view of FIG. 5, the centering portion 193 of the disc clamp 134 including the centering tabs 194 is preferably beveled or arched in shape such that the raised portion 196 of each of the centering tabs 194, having the upper contact surface 144, is on a higher horizontal plane than the outer periphery 197 having the lower contact surface 146. Opposed forces can be applied through the disc clamp 134 via the upper and lower contact surfaces 144 and 146. Preferably, when such forces are applied to the disc clamp 134, it is compressed in the directions as shown by arrows 151 and 152, such that the vertical distance between the horizontal upper contact surface 144 and the lower contact surface 146 is decreased. Furthermore, the inner centering tabs 194 are shaped such that when the disc clamp 134 is compressed between the upper and lower contact surfaces 144 and 146, the inwardly facing spindle contact surface 198 moves downwardly as shown by arrow 153, and the outwardly projecting disc contact surface 199 moves outwardly, as shown by arrow 154. It is this shape and movement of the centering tabs 194 that provides the disc clamp centering function and the disc centering function of the centering tabs in accordance with the present invention.

Disc clamp 134 is preferably made from a resilient sheet material such as a spring steel that can transfer a force between the upper and lower contact surfaces. Preferably, the disc clamp 134 has a good degree of elasticity, such that the clamp can be compressed as discussed above, but will regain its original shape when the compressive forces are removed. The clamp may be made from a metal, plastic, or other material having desired spring rate characteristics. The clamp 134 can be formed into the necessary shape using any methods generally known, depending upon the particular type of material being used. For example, a spring steel clamp may be stamped or formed from sheet metal.

FIG. 6 illustrates the disc clamp 134 installed on the top portion 158 of the spindle 130 and held in place by a retainer clip 136. During installation, the inwardly facing spindle contact surfaces 198 of the centering tabs 194 engage the spindle 130 and the disc contact tip surfaces 199 push outward against the disc 108 so as to generally center the disc 108 and the clamp 134 about the spindle 130. The middle raised portion 196 extends radially over the spindle hub portion 160, preferably without contact with the hub portion. The outer peripheral portion 197 extends downward and outward over the information storage disc 108. The lower contact surface 146 of the peripheral portion 197 engages the top surface 180 of the information storage disc 108 at a position adjacent the spindle hub portion 160 and directly above the loading surface 172 of annular flange 170 of the hub portion 160.

Once the disc clamp 134 is in position over and on the spindle 130, a predetermined downward (axial) pre-load force is applied symmetrically about the spindle axis to the middle annular raised portion 196 of the tabs 194. The pre-load force axially compresses the disc clamp 134 down on the spindle mounted information storage disc 108. As the disc clamp 134 is compressed, the centering tabs 194 bend down and extend within the annular indentation 182, preferably without contact with the hub portion 160. As the disc clamp 134 is compressed, the hook shaped centering tabs 194 are pushed downward such that the inwardly projecting spindle contact surfaces 198 move inwardly to solidly engage the spindle 130, and the outwardly projecting disc contact tip surfaces 199 move outwardly to engage the inner peripheral surface 181 of the disc 108. In this way, the centering tabs 194 acts to both center the disc clamp 134 about the spindle 130 as well as to center and hold the disc 108 about the spindle 130.

The pre-load force is typically supplied by applying a downward force to the retainer member 136 while inserting the retainer member 136 laterally into the groove 159. The pre-load force is preferably distributed symmetrically around the spindle motor axis of rotation and aligned with the axis of rotation. The axial groove position, and the uniformly beveled or arched disc clamp shape control the compression of the disc clamp 134 providing the desired clamping force on the disc 108. While the disc clamp 134 is in the compressed position on the spindle 130, the disc clamp retainer 136 is inserted into the groove 159 around the spindle 130. Once the retainer 136 is inserted, the preload force may be removed. The retainer 136 then maintains the pre-loaded force on the disc clamp 134 that is, in turn, exerted against the mounted information storage disc 108.

FIG. 6 shows a disc clamp 134 compressed between the substantially parallel surfaces of the disc clamp retainer shoulder surface 142 and the top surface 180 of the information storage disc 108. The disc 108 is therefore held in place between the lower contact surface 146 of the disc clamp 134 and the loading surface 172 of the annular flange 170. The orientation of the disc clamp 134 with the surfaces 142, 180 and 172, and the generally beveled or arched annular shape of the disc clamp 134 ensures that the disc clamp's distributed load is uniform and applied normal to the top surface 180 of the information storage disc 108. An equal and opposite reaction force, between bottom surface 148 of the information storage disc 108 and the loading surface 172 of the spindle hub annular flange 170, results from the application of this normal force. The two forces (normal and reaction) create a friction force in the plane of all mating surfaces which prevents the components on the drive motor 106 from shifting relative to each other when the disc drive 100 is in use or is subjected to high levels of shock and vibration.

The disc 108 is centered in relation to the spindle 130 by the inwardly facing surfaces 198 and the outwardly projecting disc contact tip surfaces 199 of the centering tabs 194. The disc 108 is further held in place in relation to the spindle 130 by the frictional forces created between the spindle 130 and the inwardly facing surfaces 198, and between the disc 108 and the outwardly projecting disc contact tip surfaces 199 of the centering tabs 194. The orientation of the centering tabs 194 including the surfaces 198 and tip surfaces 199 ensure that the disc 108 is centered about the spindle 130, and also provide for an additional frictional force between the spindle 130 and the disc 108 to further prevent the components on the drive motor 106 from shifting relative to each other.

Figure 7:
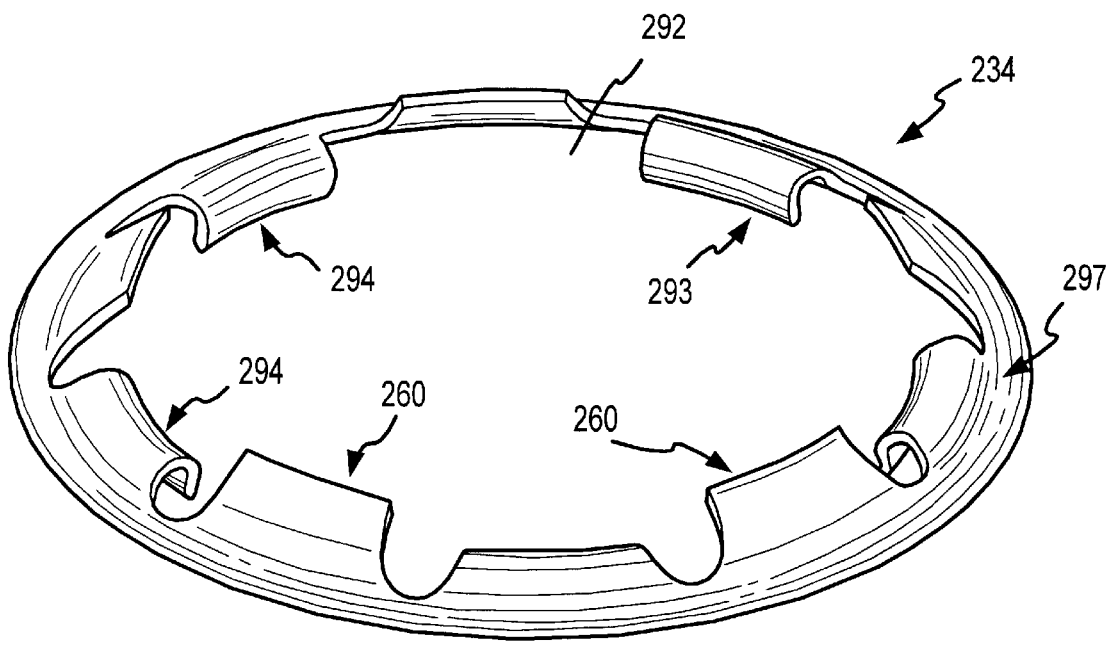
FIG. 7 is a perspective view of another preferred embodiment of a disc clamp in accordance with the present invention.
Figure 8:
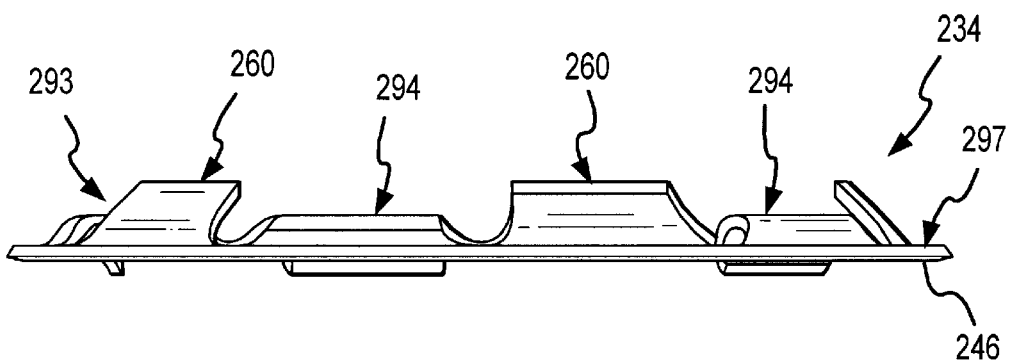
FIG. 8 is a side view of the disc clamp of FIG. 7.
Figure 9:
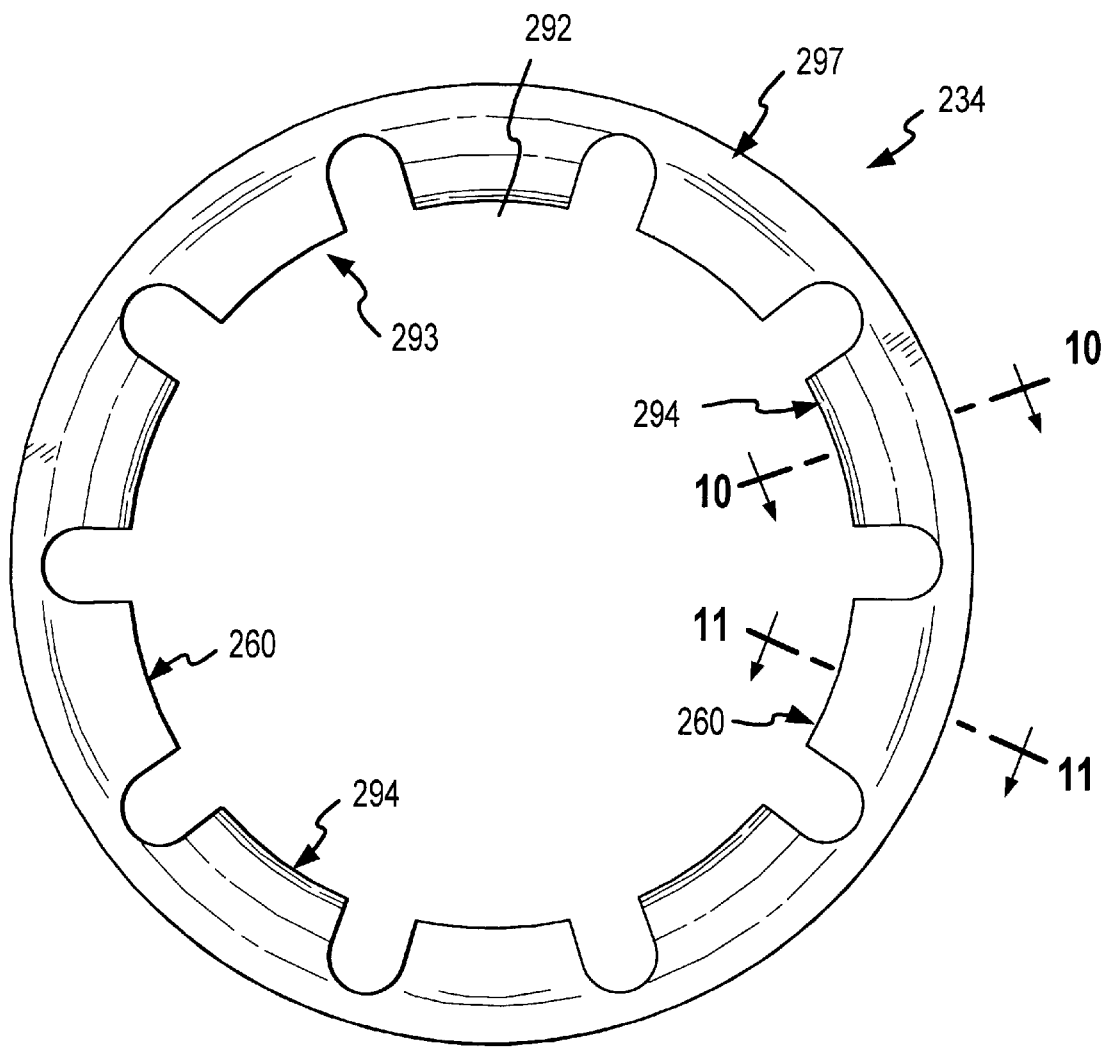
FIG. 9 is a plan view of the disc clamp of FIG. 7.

A second preferred embodiment 234 of a disc clamp in accordance with the present invention is illustrated in FIGS. 7–13,. FIGS. 7–9 illustrate the disc clamp 234 generally as an annular member that has an outer peripheral portion 297 that has a lower contact surface 246, and defines a centrally located aperture 292. The disc clamp 234 further includes a centering portion 293 that includes a plurality of centering tabs 294 and a plurality of disc clamp retainer tabs 260 that are connected to the outer peripheral portion 297. Preferably, the centering tabs 294 and the retainer tabs 260 are alternately disposed in the centering portion 293 and merge into the outer peripheral portion 297 of the disc clamp 234.

Figure 10:
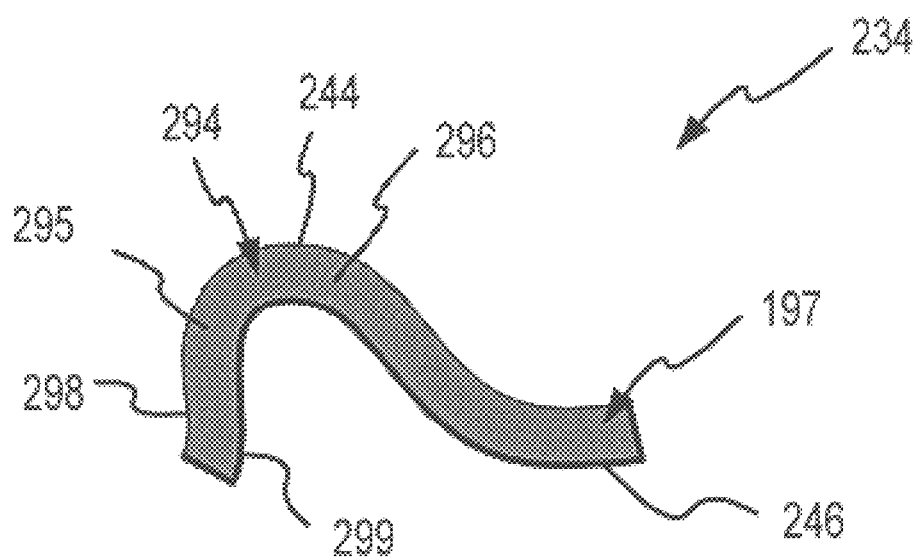
FIG. 10 is a sectional view of the disc clamp of FIG. 9 taken along lines 10—10 in FIG. 9.

The centering tabs 294 extend upwardly and inwardly and then downwardly and inwardly from the outer peripheral portion 297 into the centrally located aperture 292. The centering tabs 294 are similar to those discussed above in the first embodiment, and are preferably generally hook shaped in cross section. Referring to FIG. 10, which is a cross sectional view through a portion of the clamp 234 including a centering tab 294, each centering tab 294 includes a middle raised portion 296 having an upper surface 244, and a downwardly projecting portion 295 including a spindle contact surface 298, and an outwardly curled or projecting disc contact surface 299. The centering tabs 294 have a dual function in that they work to center the disc clamp 234 about the spindle 130, as well as to center the disc 108 about the spindle 130. Five centering tabs 294 are shown in FIGS. 7–9. However, it should be understood that additional, or fewer centering tabs 294 can be used in other embodiments. Preferably, at least three centering tabs 294 are used. In addition, other tab widths than illustrated may be utilized.

Figure 11:
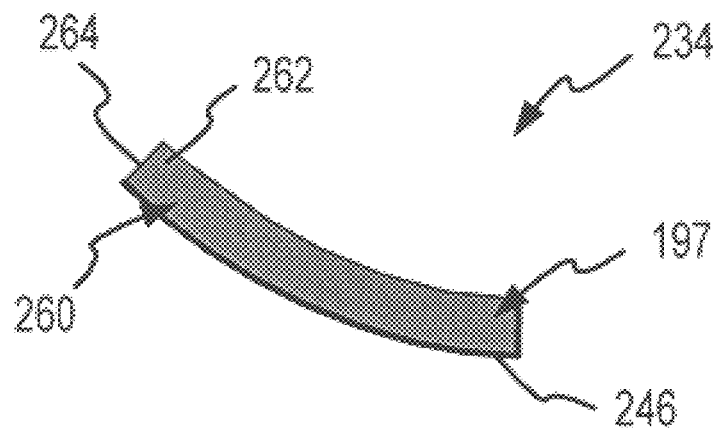
FIG. 11 is a sectional view of the disc clamp of FIG. 9 taken along lines 11—11 in FIG. 9.

The disc clamp retainer tabs 260 merge into the outer annular peripheral portion 297, and extend generally upwardly and inwardly from the outer annular peripheral portion 297 to the centrally located aperture 292. Referring to FIG. 11, which is a cross sectional view of a portion of the disc clamp including a retainer tab 260, as shown by lines 11—11 in FIG. 9 the disc clamp 234 portion including the retainer tab 260 is generally arched or beveled in shape. Each retainer tab 260 includes a spindle contact end 262 including a spindle contact surface 264. The retainer tabs 260 are adapted to engage a structure in the spindle 130, and function to maintain a downward force on the outer annular peripheral portion 297 of the disc clamp, and maintain the position of the disc clamp 234. Five retainer tabs 260 are shown in FIGS. 7–9. However, it should be understood that additional, or fewer retainer tabs 260 can be used in other embodiments. Preferably, at least three retainer tabs 260 are used. In addition, other tab widths than illustrated may be utilized.

Applied opposed clamp forces can be maintained against the disc 108 on the hub 160 through the disc clamp 234 via the retainer tabs 260 and lower contact surfaces 246. Preferably, when such forces are applied to the disc clamp 234, it is compressed such that the force is maintained and transferred to the disc 108. Furthermore, the inner centering tabs 294 are shaped such that when the disc clamp 234 is compressed on the spindle 130, the inwardly facing spindle contact surfaces 298 press against the spindle 130, and the outwardly projecting disc contact surfaces 299 engage and center the disc 108.

Disc clamp 234 is generally made from the same general type of resilient, and preferably spring elastic material, using the same general techniques as discussed above with the first embodiment disc clamp 134.

Figure 12:
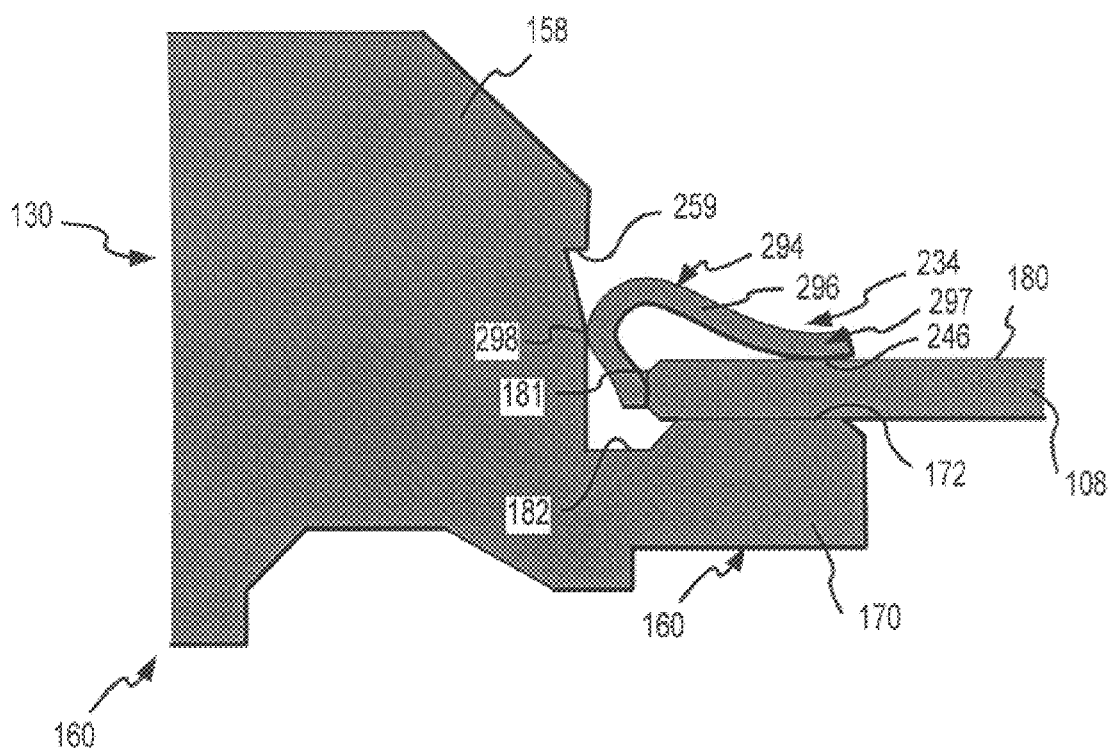
FIG. 12 is a sectional view of the disc clamp of FIG. 7 installed in the disc clamping assembly mounted on a drive motor spindle as in FIG. 1, the cross section taken through one of the centering tabs of the disc clamp.
Figure 13:
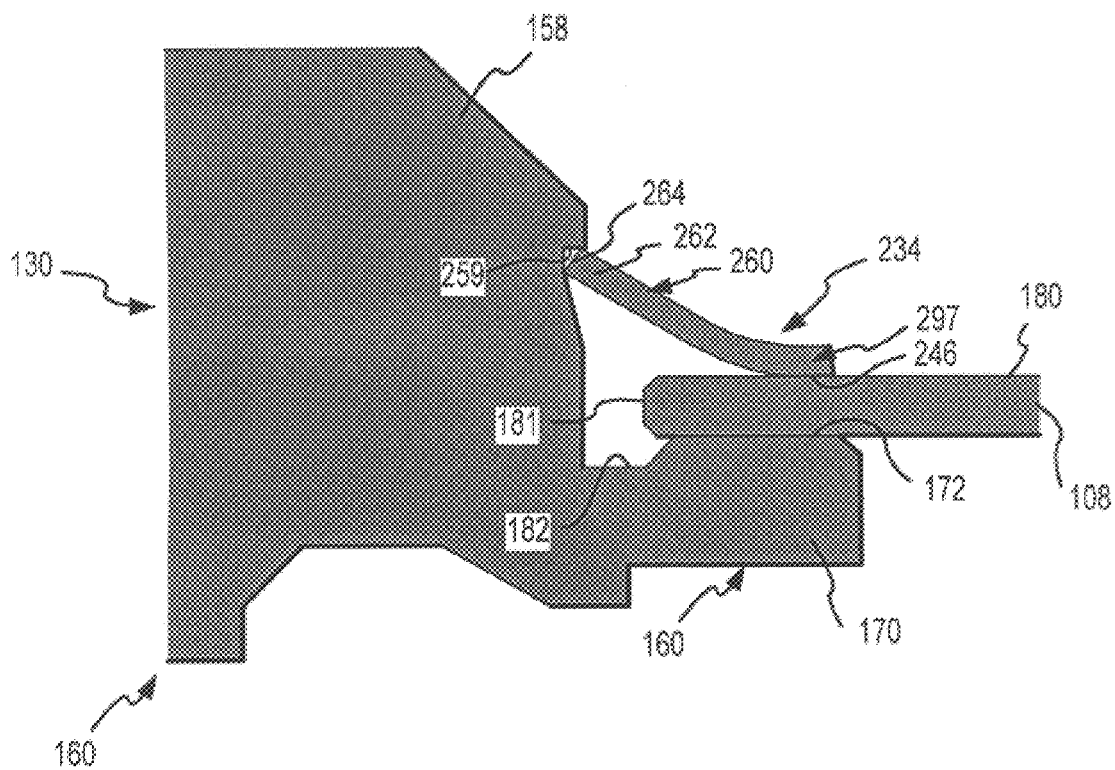
FIG. 13 is a sectional view of the disc claim of FIG. 7 installed in the disc clamping assembly mounted on a drive motor spindle as in FIG. 1, the cross section taken through one of the locking tabs of the disc clamp.

FIGS. 12 and 13 illustrate cross sectional views of the disc clamp 234 in use in the drive motor 106 of a disc drive 100. The cross section of FIG. 12 is taken through one of the centering tab portions 294 of the disc clamp 234, while FIG. 13 is a cross section taken through one of the retainer tab portions 260 of the disc clamp 234. The disc drive 100 in FIGS. 12 and 13 is of the same general structure as the disc drive 100 of FIG. 6, with like reference numerals referring to like elements. However, the annular groove 259 in the top portion 158 of the spindle 130 shown in FIGS. 12 and 13 may be slightly different in that it is angled inwardly as shown such it can better mate with and retain disc clamp retainer tabs 260 as is described in greater detail below.

The disc clamp 234 is positioned over and on the top portion 158 of the spindle 130. The inner annular spindle contact or centering tabs 294 engages the spindle 130, and act to center the disc clamp 234 about the spindle 130. Additionally, retainer tabs 260 also engage the spindle 130, and act to center the disc clamp 234 about the spindle 130. The middle raised portions 296 of the centering tabs 294 extend radially outwardly over the spindle hub portion 160 without contacting the hub portion. The outer peripheral portion 297 extends down and over part of the information storage disc 108. The lower contact surface 246 engages the top surface 180 of the information storage disc 108 at a position directly above and in line with the annular flange 170 of the hub portion Once the disc clamp 234 is in position over the spindle 130 such that the lower contact surface 246 touches the top surface 180 of the disc 108, a predetermined downward pre-load force is applied symmetrically about the spindle axis to the disc clamp 234. The pre-load force axially compresses the disc clamp 234 down on the information storage disc 108. As the disc clamp 234 is compressed, the centering tabs 294 bend down and extend within the annularly extending indentation 182, preferably without contact with the hub 160. As compression continues, the hook shaped centering tabs 294 extend downwardly such that the inwardly facing spindle contact surfaces 298 solidly engage the spindle 130, and the outwardly projecting disc contact surfaces 299 move outward and engage the inner peripheral surface 181 of the disc 108. Therefore, the centering tabs 294 acts to both center the disc clamp 234 about the spindle 130 as well as to center and hold the disc 108 about the spindle 130.

The pre-load force is typically supplied, for example, by applying a vertical downward force to the retainer tabs 260 when inserting the retainer tabs 260 into the groove 259. It is envisioned that the pre-load force be distributed symmetrically around the spindle motor axis of rotation and be directly aligned with the axis of rotation. The groove position, and the uniformly beveled or arched disc clamp shape control the compression of the disc clamp 234 providing the desired clamping force on the disc 108.

The disc clamp 234 is then in a compressed position, with the centering tabs 294 engaging the spindle 130 and the disc 108 to center the disc clamp 234 and the disc 108 about the spindle 130. The disc clamp retainer tabs 260 are then mated to groove 259 in the spindle 130 to maintain the downward force, and to secure the disc clamp 234 in position. The pre-load force can then be released from the disc clamp 234, and a predetermined amount of force is maintained on the disc clamp by the engagement of the retainer tabs 260 with the groove 259 in the spindle 130.

FIG. 13 shows the disc clamp 234 compressed between the annular groove 259 and the top surface 180 of the information storage disc 108. The disc 108 is therefore held in place between the lower contact surface 246 of the disc clamp 234 and the loading surface 172 of the annular flange 170. The orientation of the disc clamp 234 with the groove 259 and the surfaces 180 and 172, and the generally annular shape of the disc clamp 134 ensures that the disc clamp's distributed load is uniform and applied normal to the top surface 180 of the information storage disc 108. An equal and opposite reaction force, between bottom surface 148 of the information storage disc 108 and the loading surface 172 of the spindle hub annular flange 170, results from the application of this normal force. The two forces (normal and reaction) create a friction force in the plane of all mating surfaces which prevents the components on the drive motor 106 from shifting relative to each other when the disc drive 100 is in use or is subjected to high levels of shock and vibration.

The disc 108 is centered in relation to the spindle 130 by the inwardly facing surfaces 298 and the outwardly projecting disc contact surfaces 299 of the centering tabs 294 (FIG. 12). The disc 108 is further held in place in relation to the spindle 130 by the frictional forces created between the spindle 130 and inwardly facing surfaces 298, and between the disc 108 and the outwardly projecting disc contact surfaces 299 of the centering tabs 294. The orientation of the centering tabs 294 including the surfaces 298 and 299 ensure that the disc 108 is centered about the spindle 130, and also provides for an additional frictional force between the spindle 130 and the disc 108 to further prevent the components of the spindle assembly 106 from shifting relative to each other.

Figure 14:
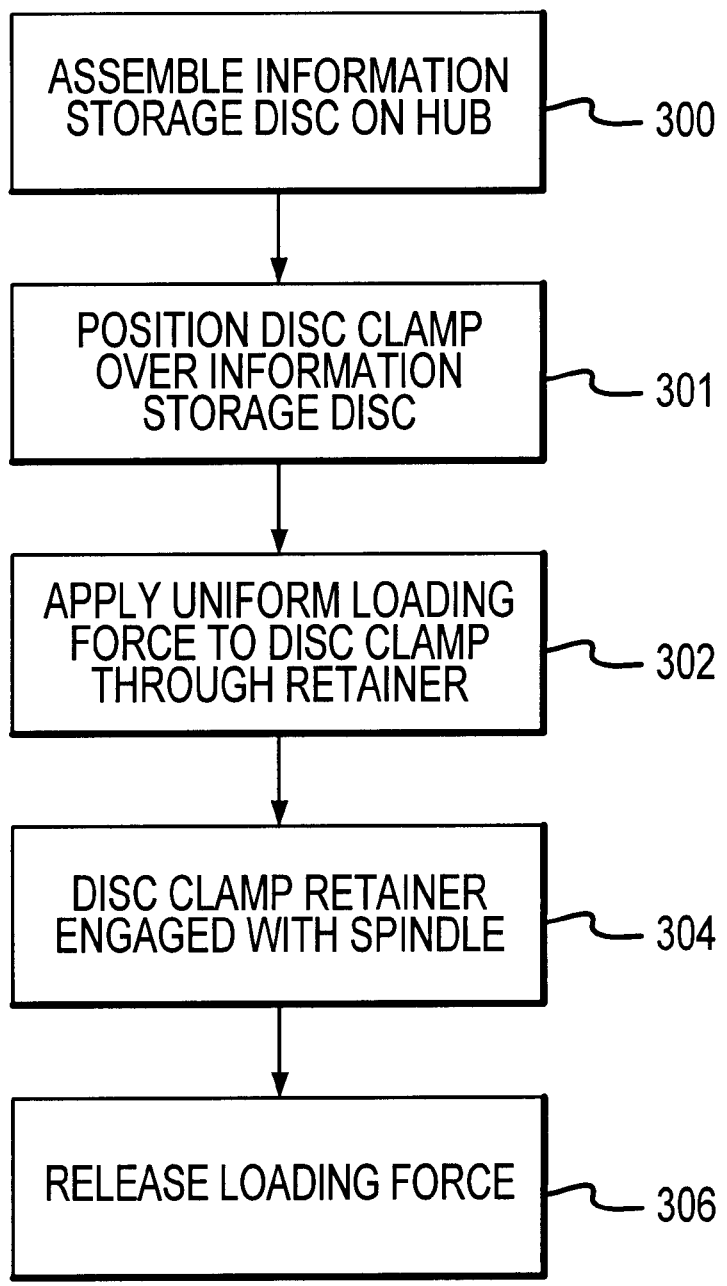
FIG. 14 is a is a flow chart showing the steps for assembling the disc clamping assembly in accordance with a preferred embodiment of the present invention.

FIG. 14 is a flow diagram showing the steps for installing and securing a disc clamp, such as 134 or 234 on a disc drive spindle 130 utilizing preferred embodiments of the invention. In operation 300, the information storage disc 180 is assembled onto the hub portion 160 of the disc drive motor spindle 130 and positioned against the disc loading surface 172 of the flange 170. In operation 301, the disc clamp 134 or 234 is positioned over and generally centered on an information storage disc 108 on the spindle motor by the centering tabs 194 or 294. In embodiments where a separate retainer, such as 136, is needed, the retainer is also positioned over the spindle. In operation 302, a uniformly distributed loading force is applied to the disc clamp 134 or 234 through the retainer member 136, or in embodiments with retainer tabs 260, through the retainer tabs 260. The force is applied in a direction normal to the information storage disc 108 so as to deflect the disc clamp to a predetermined compressed position. As the clamp is compressed, the disc clamp and the disc are centered in relation to the spindle by the inwardly facing surfaces 198 and the outwardly projecting disc contact surfaces 199 of the centering tabs 194. In operation 304, while the loading force compresses the mounted information storage disc 108, the disc clamp retainer, such as 136, or the disc clamp retainer tabs 260, engage with the spindle to secure the disc clamp to the spindle assembly. Finally, in operation 306, the load force is released from the disc clamp retainer 136 or retainer tabs 260.

Therefore, the apparatus and method in accordance with the present invention includes applying an evenly distributed predetermined loading force to a disc clamp on a spindle motor through the retainer member or retainer tabs, and the centering of the disc clamp and the disc about the spindle of the motor. The spindle motor has a series of parallel surfaces that interact together under the loading force to ensure a uniform loading and consequent reaction force to secure the information storage disc on the spindle motor. The predetermined loading force ensures that the force and reaction force are aligned with the spindle axis of rotation and thus that the disc clamp is uniformly and centrally loaded onto the information storage disc. The disc clamp has a series of centering tabs having surfaces that interact with the spindle and the disc to center the disc clamp and the disc about the spindle.

In summary, the present invention may be viewed as a disc drive motor assembly (such as 106) including a rotatable motor spindle (such as 130) having a top portion (such as 158) and a hub portion (such as 160). The assembly further includes an annular information storage disc (such as 108) mounted over the top portion and supported on the hub portion. An annular disc clamp (such as 134 or 234) is mounted over the top portion (such as 158), and has a centering portion (such as 193 or 293) and a peripheral clamping portion (such as 197 or 297). A disc clamp retainer (such as 136 or 236) is fastened to the spindle (such as 130) applying a compressive force to the disc clamp (such as 134 or 234) to secure the disc (such as 108) against the hub portion (such as 160). The centering portion of the disc clamp has a series of spaced centering tabs (such as 194 or 294) adapted to abut the spindle (such as 130) and symmetrically push against the annular disc when the compressive force is applied to the disc clamp (such as 134 or 234).

In some embodiments, the centering tabs (such as 194 or 294) are hook shaped tabs. The disc clamp retainer (such as 236) can include a series of inwardly directed retainer tabs (such as 260) on the disc clamp (such as 236) engaging the spindle (such as 130) to fasten the clamp about the spindle. In some embodiments, the spindle (such as 130) includes a groove (such as 259) in the top portion (such as 158), and the retainer tabs (such as 260) engage the groove to fasten the clamp about the spindle. In some assemblies, the centering portion (such as 193 or 293) has a retainer tab (such as 260) between each centering tab (such as 194 or 294). In some other embodiments, the disc clamp retainer (such as 136 or 236) can include a snap ring fastened in a groove (such as 136) in the top portion (such as 158) of the spindle (such as 130).

In some embodiments, the hub portion (such as 160) defines an annular flange (such as 170) having a loading surface (such as 172) for receiving the information storage disc (such as 108) thereon and wherein the disc is secured between the disc clamp (such as 134 or 234) and the loading surface of the annular flange. The disc clamp (such as 134 or 234) is secured between the disc clamp retainer (such as 136 or 236) and the top surface of the disc (such as 108).

In some assemblies, the hub portion (such as 160) includes an annular indentation (such as 182) surrounding and adjacent the spindle (such as 130), and a portion of the centering tabs (such as 194 or 294) extend into the annular indentation.

In another regard, the present invention may be viewed as a disc clamp (such as 134 or 234) for use in a disc drive (such as 100) for centering and securing a data storage disc (such as 108) on a drive motor spindle (such as 130), wherein the drive motor spindle has a top portion (such as 158) and an annular hub portion (such as 160). The disc clamp includes an annular disc shaped body (such as 135 or 235) having a centering portion (such as 193 or 293) around a central aperture (such as 192 or 292) and an annular peripheral clamping portion (such as 197 or 297). The centering portion has a series of centering tabs (such as 194 or 294) extending inwardly toward the central aperture from the peripheral clamping portion. Each of the centering tabs (such as 194 or 294) has a middle portion (such as 196 or 296), an inward surface (such as 198 or 298) for contacting the drive motor spindle (such as 130), and an outwardly projecting tip surface (such as 199 or 299) for contacting the data storage disc (such as 108) when the disc and the clamp are installed on the top portion (such as 158) of the spindle (such as 130) and a compressive force is applied to the clamp thereby center the disc and clamp the disc to the hub portion of the spindle.

In some embodiments, the centering tabs (such as 194 or 294) are hook shaped. Additionally, in some embodiments, the centering portion (such as 193 or 293) further includes a series of retainer tabs (such as 260) extending inwardly from the peripheral portion (such as 197 or 297) adapted to engage the drive motor spindle (such as 130) to fasten the clamp about the spindle. In some such embodiments, the retainer tabs (such as 160) are adapted to engage a groove (such as 259) in the top portion (such as 259) of the drive motor spindle (such as 130). In some embodiments, the centering portion (such as 193 or 293) has a retainer tab (such as 260) between each centering tab (such as 194 or 294). In some instances, the centering tabs (such as 194 or 294) are curved in a first vertical direction and the retainer tabs (such as 260) are curved in an opposite vertical direction. In some cases, the clamp (such as 134 or 234) is made of sheet metal.

In some embodiments, the three or more centering tabs (such as 194 or 294) are used. In some embodiments, the cross sectional shape of the disc clamp (such as 134 or 234) is arched such that the middle portion (such as 296) of the centering tabs (such as 194 or 294) is on a higher vertical plane than the peripheral clamping portion (such as 197 or 297). In some embodiments, the disc clamp retainer (such as 136 or 236) is a snap ring fastened in a groove (such as 159 or 259) in the top portion of the spindle.

In another regard, the present invention may be viewed as a disc drive motor assembly (such as 106) including an information storage disc (such as 108) mounted on a hub portion (such as 160) of a spindle (such as 130), and means for centering the disc about the spindle and applying a uniform clamping force to the information storage disc to secure the disc to the hub portion.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. For example, although the embodiments described above involve a single information storage disc being secured to a spindle hub, those of skill in the art, and others, will understand that the disc clamps and disc clamp assemblies of the invention can be used to secure multiple disc stacks to a spindle hub. For instance, annular disc spacers can be stacked between multiple information storage discs to form a disc stack, and the disc stack can be secured between the bottom annular flange of the hub and the disc clamp. The disc clamp would contact the top surface of the top disc in the stack, and the annular flange on the hub would contact the bottom surface of the bottom disc in the stack to secure the disc stack in position on the hub. The vertical distance between the bottom annular flange and the disc clamp would necessarily need to be increased as additional discs are added to the stack. Many other such modifications, changes and alternatives are also contemplated, and will be apparent to those of skill in the art. Accordingly, all such modifications, changes and alternatives are encompassed in the spirit of the invention disclosed and as defined in the appended claims.

What is claimed is:

1. A disc drive motor assembly comprising:
   a rotatable motor spindle having a top portion and a hub portion;
   an annular information storage disc mounted over the to portion and supported on the hub portion;
   an annular disc clamp mounted over the top portion having a centering portion and a peripheral clamping portion; and
   a disc clamp retainer fastened to the spindle applying a compressive force to the disc clamp to secure the disc against the hub portion, wherein centering portion of the disc clamp has a series of spaced centering tabs adapted to abut the spindle and symmetrically push outward against an inner peripheral surface of the annular disc when the compressive force is applied to the disc clamp.

2. The assembly of claim 1, wherein the centering tabs are hook shaped tabs.

3. The assembly of claim 1, wherein the disc clamp retainer includes a series of inwardly directed retainer tabs on the disc clamp engaging the spindle to fasten the clamp about the spindle.

4. The assembly of claim 3, wherein the spindle includes a groove in the top portion, and the retainer tabs engaging the groove to fasten the clamp about the spindle.

5. The assembly according to claim 3, wherein the centering portion has a retainer tab between each centering tab.

6. The assembly of claim 1, wherein the disc clamp retainer is a snap ring fastened in a groove in the top portion of the spindle.

7. The assembly of claim 1, wherein the hub portion defines an annular flange having a loading surface for receiving the information storage disc thereon and wherein the disc is secured between the disc clamp and the loading surface of the annular flange.

8. The assembly of claim 1, wherein the disc clamp is secured between the disc clamp retainer and the top surface of the disc.

9. The assembly of claim 1, wherein the hub portion includes an annular indentation surrounding and adjacent the spindle, and wherein a portion of the centering tabs extend into the annular indentation.

10. The disc drive motor assembly of claim 1 wherein the centering tabs further comprise:
    a middle raised portion having an upper contact surface for contacting the disc clamp retainer;
    a downwardly projecting portion having an inwardly facing surface for contacting the drive motor spindle; and
    an outwardly projecting tip surface for contacting the inner peripheral surface of the disc.

11. The assembly of claim 10, wherein the disc clamp retainer is a snap ring fastened in a groove in the top portion of the spindle.

12. The disc drive motor assembly of claim 1 wherein the peripheral clamping portion has a lower contact surface for engaging a top surface of the disc.

13. A disc clamp for use in a disc drive for centering and securing a data storage disc on a drive motor spindle, wherein the drive motor spindle has a top portion and an annular hub portion, the disc clamp comprising:

an annular disc shaped body having a centering portion around a central aperture and an annular peripheral clamping portion, the centering portion having a series of centering tabs extending inwardly toward the central aperture from the peripheral clamping portion, each of the centering tabs having a middle portion, an inward surface for contacting the drive motor spindle, and an outwardly projecting tip surface for contacting the data storage disc when the disc and the clamp are installed on the top portion of the spindle and a compressive force is applied to the middle portion of the centering tabs thereby centering the disc about the spindle and clamping the disc to the hub portion of the spindle.

14. The disc clamp of claim 13, wherein the centering tabs are hook shaped.

15. The disc clamp of claim 14, wherein the centering tabs are curved in a first vertical direction and the retainer tabs are curved in an opposite vertical direction.

16. The disc clamp of claim 13, wherein the centering portion further comprises a series of retainer tabs extending inwardly from the peripheral portion adapted to engage the drive motor spindle to fasten the clamp about the spindle.

17. The disc clamp of claim 16, wherein the retainer tab are adapted to engage a groove in the top portion of the drive motor spindle.

18. The assembly according to claim 16, wherein the centering portion has a retainer tab between each centering tab.

19. The disc clamp of claim 13, wherein the clamp is made of sheet metal.

20. The disc clamp of claim 13, comprising three or more centering tabs.

21. The disc clamp of claim 13, wherein the cross sectional shape of the disc clamp is arched such that the middle portion of the centering tabs is on a higher vertical plane than the peripheral clamping portion.

22. The disc clamp of claim 13 wherein the outwardly projecting tip surface contacts an inner peripheral surface of the data storage disc.

23. The disc clamp of claim 22 wherein the peripheral clamping portion has a lower contact surface for engaging a top surface of the disc.

* * * * *

UNITED STATES PATENT AND TRADEMARK OFFICE
CERTIFICATE OF CORRECTION

PATENT NO.    : 6,567,238 B1
DATED         : May 20, 2003
INVENTOR(S)   : Renken et al.

It is certified that error appears in the above-identified patent and that said Letters Patent is hereby corrected as shown below:

<u>Column 12,</u>
Line 15, replace "to" with -- top --.

Signed and Sealed this

Seventh Day of October, 2003

JAMES E. ROGAN
*Director of the United States Patent and Trademark Office*